US008560692B1

(12) United States Patent
Chandra Sekhar et al.

(10) Patent No.: US 8,560,692 B1
(45) Date of Patent: Oct. 15, 2013

(54) USER-SPECIFIC CACHE FOR URL FILTERING

(75) Inventors: Bharath Kumar Chandra Sekhar, Santa Clara, CA (US); Narasimham Kodukula, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 1266 days.

(21) Appl. No.: 11/899,609

(22) Filed: Sep. 5, 2007

(51) Int. Cl.
*G06F 15/173* (2006.01)
*G06F 15/16* (2006.01)

(52) U.S. Cl.
USPC .......................................... 709/226; 709/218

(58) Field of Classification Search
USPC .................................................. 709/218, 226
See application file for complete search history.

(56) References Cited

U.S. PATENT DOCUMENTS

| | | | |
|---|---|---|---|
| 7,143,088 B2 | 11/2006 | Green et al. | |
| 7,155,451 B1 | 12/2006 | Torres | |
| 7,167,835 B2 | 1/2007 | Coomber et al. | |
| 7,174,377 B2 | 2/2007 | Bernard et al. | |
| 7,185,272 B2 | 2/2007 | Pearce et al. | |
| 7,194,464 B2 | 3/2007 | Kester et al. | |
| 7,219,299 B2 | 5/2007 | Fields et al. | |
| 7,228,303 B1 | 6/2007 | Brenes et al. | |
| 7,228,438 B2 | 6/2007 | Bushmitch et al. | |
| 7,249,315 B2 | 7/2007 | Moetteli | |
| 2002/0062372 A1* | 5/2002 | Hong et al. | 709/225 |
| 2002/0133570 A1* | 9/2002 | Michel | 709/219 |
| 2005/0132049 A1* | 6/2005 | Inoue et al. | 709/225 |
| 2006/0064469 A1* | 3/2006 | Balasubrahmaniyan et al. | 709/218 |
| 2008/0163380 A1* | 7/2008 | Liu | 726/28 |

OTHER PUBLICATIONS

MD5 (Message-Digest algorithm5—Wikipedia, the free encyclopedia, pp. 1-6, webpage [online][retrieved on Aug. 16, 2007], retrieved from the internet: http://en.wikipedia.org/wiki/MD5.
Microsoft Internet Security and Accelerator Server, pp. 1-2, webpage [online][retrieved on Aug. 16, 2007], retrieved from the internet: http://www.microsoft.com/isaserver/partners/accesscontrol.mspx.
Trend Micro Email Reputation Services, pp. 1-2, webpage [online][retrieved on Aug. 16, 2007], retrieved from the internet: http//us.trendmicro.com/us/products/enterprise/network-reputation-services/index.html.
NETWORKWORLD—What You Do Know Can Hurt You, "Cisco moving reputation services into network devices" Network World, pp. 1-3, webpage [online][retrieved on Aug. 16, 2007], retrieved from the Internet: http//www.networkworld.com/news/2007/062507-cisco-ironport.html.
NETWORKWORLD—What You Do Know Can Hurt You, "IronPort adds Web reputation service to SenderBase" Network World, pp. 1-3, webpage [online][retrieved on Aug. 16, 2007], retrieved from the internet: http//www.networkworld.com/news/2006/012306-ironport.html.

* cited by examiner

*Primary Examiner* — Noel Beharry
(74) *Attorney, Agent, or Firm* — Okamoto & Benedicto LLP

(57) ABSTRACT

Cache storage area for caching data for URL filtering is reserved for each user in a multi-user computing environment. The cache storage area may include a user-specific cache with user cache areas allocated for each particular user. The user cache areas may include entries for data pertaining to URL filtering. For example, the entries may include URL filtering results or references to URL filtering results stored in a general cache. Cache data may include a reference count to indicate the number of users for which the data is being cached. The reference count may be taken into account in the maintenance of the general and user-specific cache areas.

4 Claims, 4 Drawing Sheets

USER-SPECIFIC CACHE FOR URL FILTERING

BACKGROUND OF THE INVENTION

1. Field of the Invention

The present invention relates generally to computer security, and more particularly but not exclusively to methods and apparatus for filtering computer network traffic.

2. Description of the Background Art

Computers coupled to the Internet may access websites to view various kinds of information. The websites, which are hosted on web servers, include one or more web pages that may be displayed on a web browser of a user's client computer. Each web page has a corresponding network address, commonly referred to as a URL (uniform resource locator), that allows a web browser to locate the web page. The web browser may be pointed to the URL to render the web page on the browser for viewing by the user.

URL filtering involves monitoring of URLs to identify those that belong to prohibited websites (or any content). The websites may be prohibited by policy or other reasons. For example, a corporate computer network may prevent viewing of web pages from pornography websites. In that case, a URL filter may be configured to block URLs belonging to pornography websites. When a web browser attempts to access one of the blocked pornography websites, the URL filter will recognize the URL and block the access.

URL filtering may be performed at a gateway of a computer network. The gateway may perform URL filtering by consulting a web reputation service or other database with information about the URL. Because this consultation or process of finding information about a URL takes time, previously obtained URL information is typically cached for improved performance. Embodiments of the present invention pertain to a caching scheme for URL filtering, and similar applications, for improved user experience in a multi-user computing environment.

SUMMARY

Cache storage area for caching data for URL filtering is reserved for each user in a multi-user computing environment. The cache storage area may include a user-specific cache with user cache areas allocated for each particular user. The user cache areas may include entries for data pertaining to URL filtering. For example, the entries may include URL filtering results or references to URL filtering results stored in a general cache. Cache data may include a reference count to indicate the number of users for which the data is being cached. The reference count may be taken into account in the maintenance of the general and user-specific cache areas.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
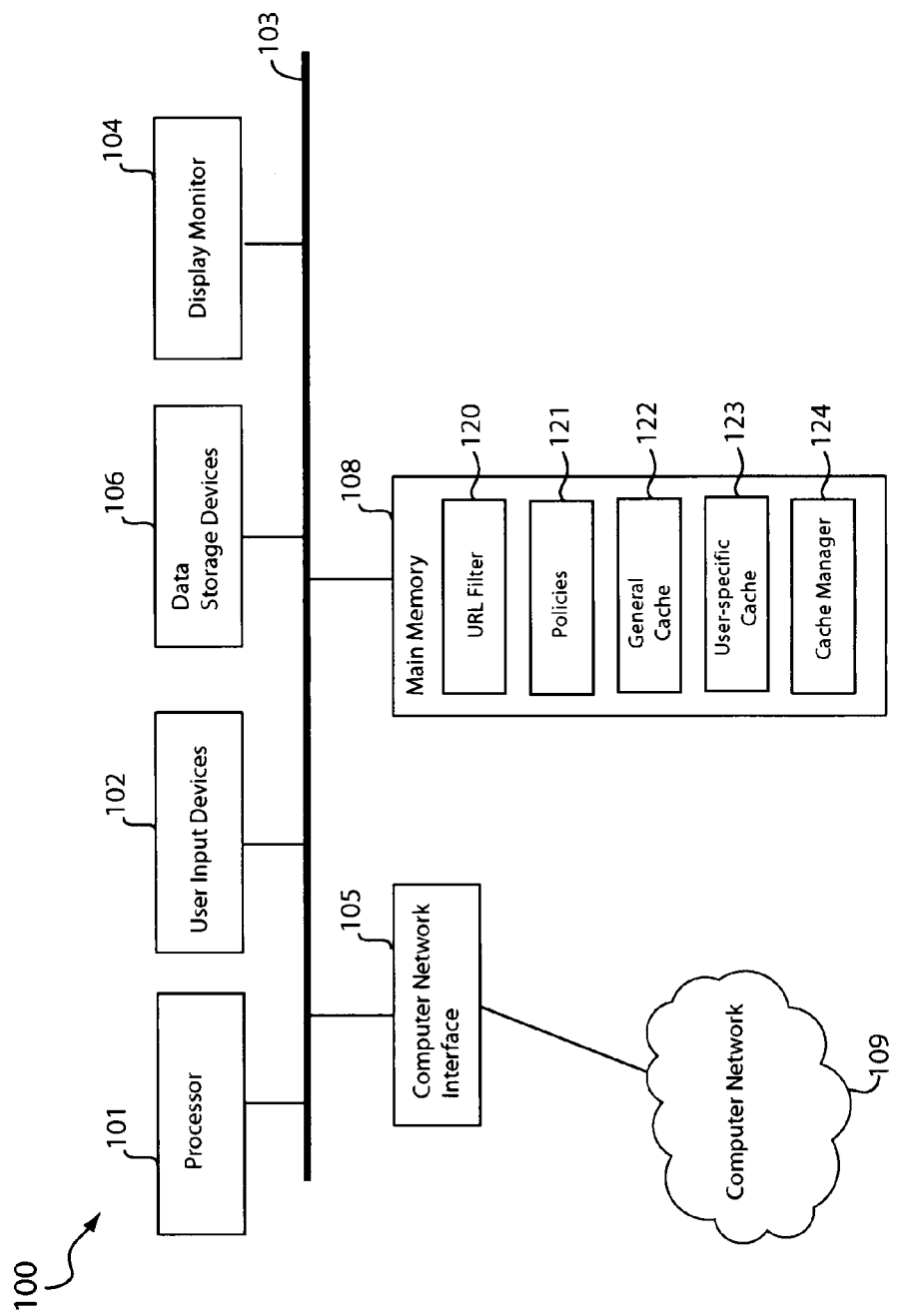
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a gateway computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 1, the main memory 108 includes a URL filter 120, policies 121, general cache 122, user-specific cache 123, and a cache manager 124. The aforementioned components in the main memory 108 may be loaded from the data storage device 106 to the main memory 108 for execution by the processor 101. The computer network interface 105 may be coupled to a computer network 109, which in this example includes the Internet.

The URL filter 120 may comprise computer-readable program code for monitoring network addresses on network traffic to enforce the policies 121. As its name implies, the URL filter 120 performs URL filtering in this embodiment. The URL filter 120 may perform URL filtering by receiving information about a URL, such as its reputation, and consulting the policies 121 for actions to perform on the URL based on its information.

In one embodiment, the URL filter 120 consults a web reputation service to determine the reputation of a URL, such as the type of content available from the URL, activities associated with the URL, or category of the URL. For example, the web reputation service may keep a listing of URLs of servers for particular categories, such as pornography, phishing, fraudulent schemes, etc. The URL filter 120 may take advantage of this service by providing the URL to the web reputation service to determine if the URL is associated with a category that is prohibited by the policies 121. For example, the policies 121 may prohibit access to web pages from pornography sites by designating the URLs of pornography sites as blocked. The URL filter 120 may also be configured to determine if a URL is blocked by consulting a local listing of blocked URLs; such a local listing may be included in the policies 121. The URL filter 120 may be configured to block network traffic to and from blocked URLs. As a particular example, the URL filter 120 may be configured to block web browsers from accessing web pages (or other data) with blocked URLs.

The policies 121 may include a listing of policies to be enforced by the URL filter 120. The policies 121 may include a listing of blocked URLs by category, actual URL (i.e., by specific reference to the URL), etc. As can be appreciated, the policies 121 may be configured to indicate blocking of any data or communications with or involving a particular URL, not just web pages.

The general cache 122 may comprise storage area for storing URL filtering results, such as URL information, whether a URL is blocked or allowed, and/or other data previously obtained or generated by the URL filter 120. For example, the general cache 122 may include a listing of URLs previously determined by the URL filter 120 as blocked. The next time a user tries to access one of the blocked URLs cached in the general cache 122, the URL filter 120 would simply get the cached data instead of going through the URL filtering process, which may involve having to access a remotely located WRS server computer. The general cache 122 thus advantageously improves the speed of the URL filtering process for repeatedly accessed URLs.

The user-specific cache 123 may comprise storage area for storing data pertaining to URL filtering results, such as a reference to or the actual URL filtering results. The URL filtering results may include URL information, whether a URL is blocked or allowed, and/or other data previously obtained or generated by the URL filter 120 for URLs, for a specific user. Unlike the general cache 122, the user-specific cache 123 contains data pertaining to URL filtering results for particular users. In one embodiment, each user is reserved a certain number of entries in the user-specific cache 123 to help ensure that each user benefits from caching in a multi-user environment. This is in marked contrast to conventional caching approaches where one or a few users may use the majority of the cache area because they perform more online activities than other users in the same computer network. In that example, some users may be getting a disproportionate number of cache misses, resulting in relatively slow URL filtering process and overall bad user experience.

In one embodiment, the user-specific cache 123 includes indexes or references pointing to corresponding cache entries in the general cache. That is, instead of having the actual URL filtering results in the user-specific cache 123, the user-specific cache 123 may instead include pointers to the URL filtering results in the general cache 122. This advantageously minimizes cache storage space in cases where the URL filtering results are cached for more than one user.

The cache manager 124 may comprise computer-readable program code for managing the contents of the general cache 122 and the user-specific cache 123. In one embodiment, the cache manager 124 is configured to cache URL filtering results in the general cache 122 and the user-specific cache 123, to perform maintenance on URL filtering results cached in the general cache 122 and the user-specific cache 123, and to provide cached URL filtering results to the URL filter 120.

Figure 2:
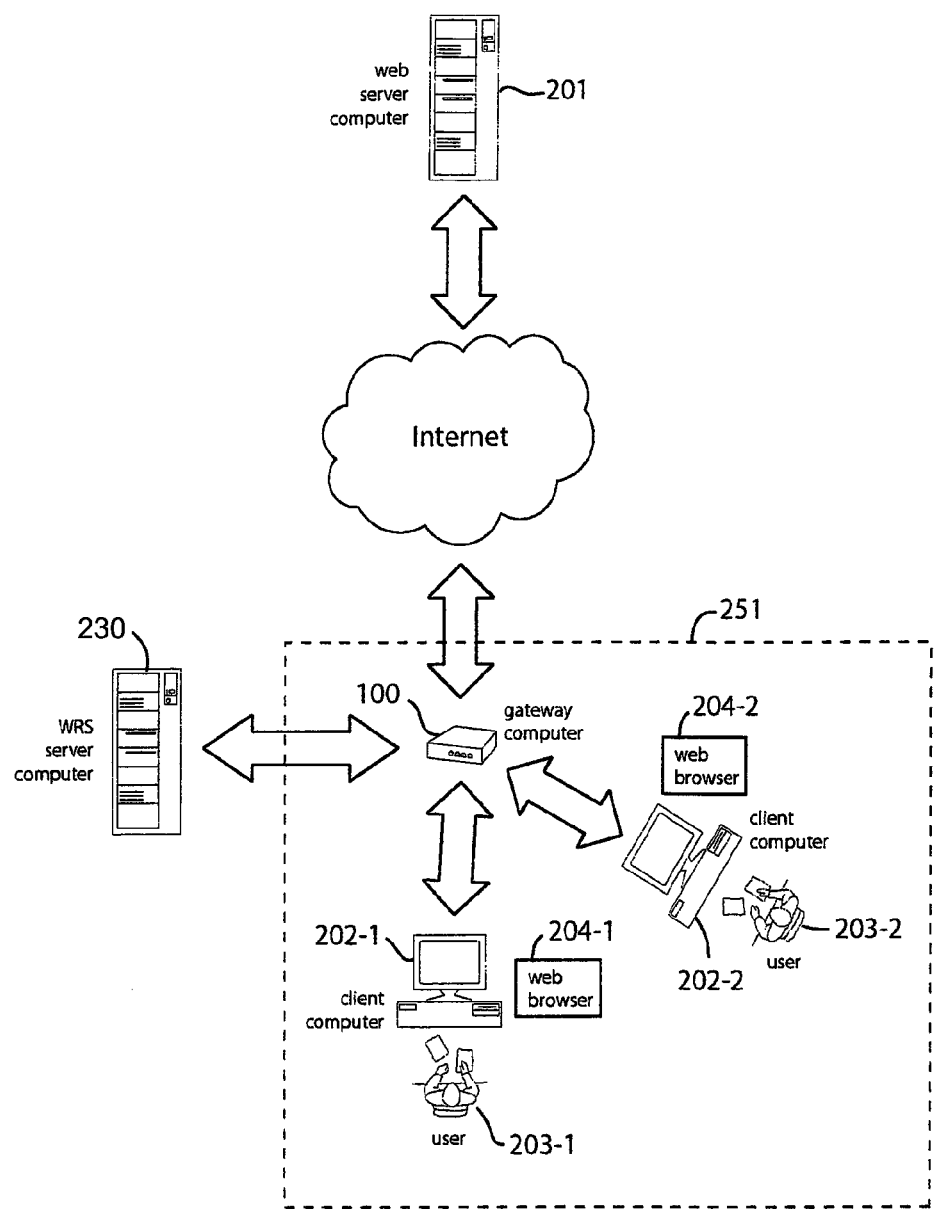
FIG. 2 schematically shows a computing environment in accordance with an embodiment of the present invention.

FIG. 2 schematically shows a computing environment in accordance with an embodiment of the present invention. In the example of FIG. 2, a computer network 251 includes one or more computers 100 and client computers 202 (i.e., 202-1, 202-2, . . . ). Only one computer 100 is employed in the network 251 in this example. The computer 100 is configured as a gateway computer in the example of FIG. 2. As a gateway, computer network communications between the Internet and the network 251 pass through the computer 100. Each client computer 202 may include a web browser 204 (i.e., 204-1, 204-2, . . . ) to access websites on the Internet. In the example of FIG. 2, a web server computer 201 hosts a website.

The computer 100 may consult a web reputation service (WRS) server computer 230 to get reputations of URLs received in the computer 100. The server computer 230 may be accessible over the Internet, locally located within the network 251, or remotely located in another computer network accessible from the network 251. The functionality of the server computer 230 may also be included in the computer 100. For example, the computer 100 may include a database of URLs of websites of prohibited categories, such as pornography, phishing, etc. In one embodiment, the server computer 230 is part of the web reputation service of Trend Micro, Inc. Other web reputation services may also be used without detracting from the merits of the present invention.

The network 251 comprises a multi-user computing environment having a plurality of users 203 on different client computers 202. In the example of FIG. 2, a user 203-1 and a user 203-2 (and other users 203) may access websites on the Internet by way of the computer 100. As previously explained with reference to FIG. 1, a computer 100 may include a user-specific cache 123 for caching URL filtering results for particular users. That is, the user 203-1 may be reserved a space in the user-specific cache 123, while the user 203-2 may be reserved his own space in the user-specific cache 123. This ensures that no single user can disproportionately fill most of cache storage area and thereby slow down URL filtering for other users.

In an example operation, the user 203-1 may employ the web browser 204-1 to receive web pages from the website hosted by the web server computer 201. The URL filter 120 (see FIG. 1) running in the computer 100 may perform URL filtering on data communications between the client computer 202-1 and the web server computer 201. The data pertaining to the results of the URL filtering may be cached in the user-specific cache 123 reserved for the user 203-1. Similarly, data pertaining to the results of URL filtering on data communications between the client computer 202-2 and the web server computer 201 (or other web server computers) may be cached in the user-specific cache 123 reserved for the user 203-2.

Figure 3:
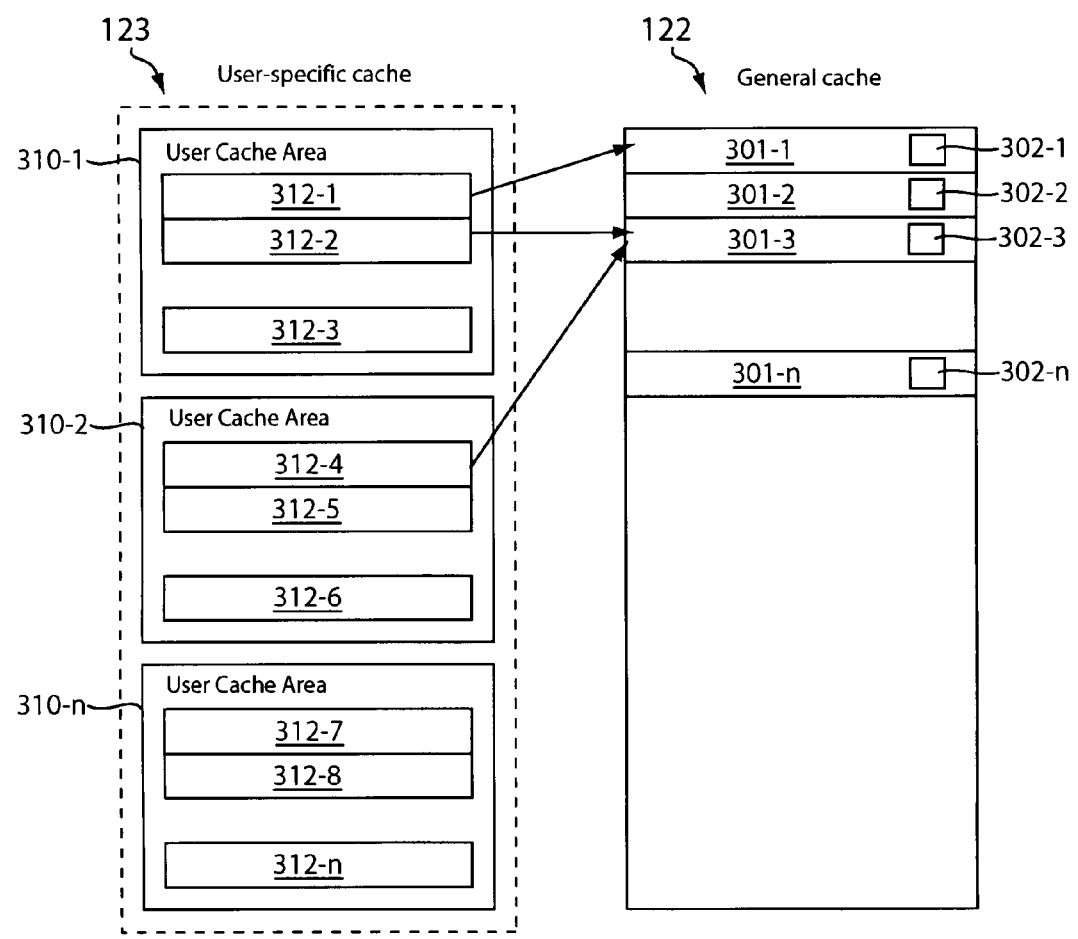
FIG. 3 schematically shows the structure of a user-specific cache and a general cache in accordance with an embodiment of the present invention.

FIG. 3 schematically shows the structure of a user-specific cache 123 and a general cache 122 in accordance with an embodiment of the present invention. As can be appreciated, other cache indexing schemes may also be employed without detracting from the merits of the present invention. In the example of FIG. 3, the general cache 122 includes a plurality of entries 301 (i.e., 301-1, 301-2, . . . ) containing cached data in the form of URL filtering results. Each entry 301 may have a corresponding time-to-live (TTL), which may be set by the cache manager 124 depending on the corresponding URL. For example, the cache manager 124 may have a longer (e.g., 2 days) TTL for science or education related URLs and shorter TTL (e.g., 3 hours) for news related URLs. The content of a URL may be presumed from its category, which may be obtained from a web reputation service. The cache manager 124 may delete entries 301 that have expired TTLs.

As shown in FIG. 3, each entry 301 may include a reference count 302 (i.e., 302-1, 302-2, . . . ). A reference count 302 indicates the number of user's for which the entry 301 is kept. For example, a reference count of two indicates that the entry 301 is cached for two users, a reference count of three indicates that the entry 301 is for three users, and so forth. The use of a reference count in this application advantageously prevents duplicated cache data, as otherwise will be the case when more than one user access contents from the same URL. Alternatively, each entry 301 may have the actual (instead of a reference to) URL filtering results for particular users.

A user-specific cache 123 may include a plurality of entries 312 (i.e., 312-1, 312-2, . . . ) containing cached data pertaining to URL filtering results, such as the URL filtering results themselves or references to them. Each individual user may be reserved a certain number of entries 312 in the user-specific cache 123. In the example of FIG. 3, a user (e.g., user 203-1 of FIG. 2) may be allocated a user cache area 310-1, a different user may be allocated a user cache area 310-2, and so on. In other words, a user cache area 310 is reserved for a particular user. This guarantees cache space for each user.

Each user cache area 310 may have a certain number of entries 312 reserved for a particular user. An entry 312 may contain cache data pertaining to the URL filtering process. The user-specific cache 123, including the user cache areas 310 and corresponding entries 312, may be in contiguous or separate memory storage locations.

In the example of FIG. 3, each entry 312 points to cache data in the general cache 122 rather than maintaining the cache data in the user-specific cache 123. In the example of FIG. 3, an entry 312-1 points to an entry 301-1 in the general cache 122. Similarly, entries 312-2 and 312-4 point to the entry 301-3. This advantageously minimizes the amount of data that has to be stored in the user-specific cache 123 and also the number of cache data that has to be maintained in the general cache 122. Similar to the entries 301, each entry 312 may have a corresponding TTL.

The cache manager 124 may increment a reference count 302 as a user caches the same entry 301. In one embodiment, the cache manager 124 decrements a reference count 302 in any of the following conditions: (a) when the user-specific cache 123 is full and more entries 312 are needed, (b) aging (i.e., expiration of TTL) of an entry 312 in the user-specific cache 123, and (c) aging of the corresponding entry 301. The first two cases (a) and (b) involve decrementing of the reference count 302 to reflect removal of an entry 312-1 in the specific cache 123. The third case (c) involves removal of the entry 301 in the general cache 122 and thus setting of the reference count 302 to zero. A reference count 302 of zero indicates to the cache manager 124 that the entry 301 may be overwritten if the need for doing so arises (e.g., need room for new entries 301).

The cache manager 124 may take into account the reference count in maintaining the general cache 122, such as what entries 301 to delete. For example, in maintaining the general cache 122, the cache manager 124 may delete entries 301 with low reference counts 302 before those with higher number reference counts 302. In one embodiment, the contents of the entries 312 and 301 are hashed (e.g., using an MD5 hash function) and may be looked up using a corresponding hash table.

Figure 4:
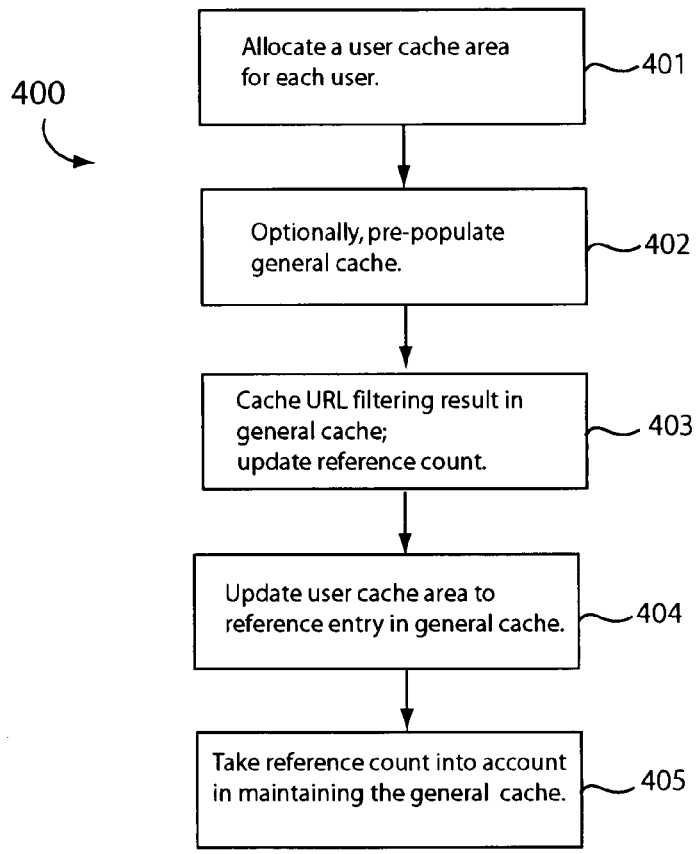
FIG. 4 shows a method of providing caching in a URL filtering process in accordance with an embodiment of the present invention.

FIG. 4 shows a method 400 of providing caching in a URL filtering process in accordance with an embodiment of the present invention. The method 400 is described using the components shown in FIGS. 1-3 as examples. Other components may also be used without detracting from the merits of the present invention.

The method 400 begins with allocating each user 203 a user cache area 310 in the user-specific cache 123 (step 401). Optionally, such as in a new installation, the general cache 122 may be populated with predetermined cached data, such as those of known good URLs (e.g., those of regularly accessed good websites) and known bad URLs. The reference counts 302 of such pre-populated cached data may be set to zero and later updated, along with corresponding entries 312 in the user-specific cache 123, as users 203 access content from those URLs.

The URL filter 120 may perform URL filtering on URLs included in network communications transmitted through the computer 100. The URL filtering results from such URL filtering may be cached by the cache manager 124 by storing them as entries 301 in the general cache 122 and updating the reference counts 302 as needed. The cache manager 124 also updates appropriate user cache areas 310 in the user-specific cache 123 to refer to corresponding entries 301 (step 404). As explained, the user-specific cache 123 contains entries 312 for particular users 203. In one embodiment, each user 203 is identified by the IP address of his client computer 202.

The cache manager 124 may take the reference counts 302 into account in maintaining the general cache 122, and thus also the user-specific cache 123 (step 405). For example, the cache manager 124 may prioritize entries 301 such that those with lower number reference counts 302 (i.e., those with lower number of users) are deleted before those with higher number reference counts 302.

Figure 5:
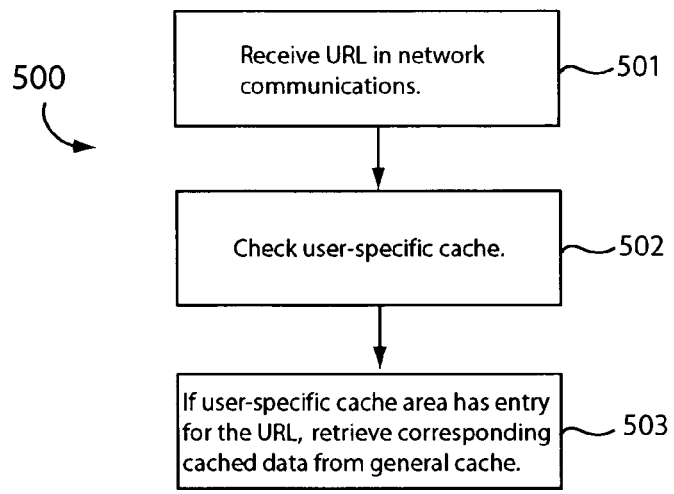
FIG. 5 shows a method of performing caching for a URL filtering process in accordance with an embodiment of the present invention.

FIG. 5 shows a method 500 of performing caching for a URL filtering process in accordance with an embodiment of the present invention. Similar to the method 400, the method 500 is described herein using the components shown in FIGS. 1-3 as examples, not limitations. The method 500 is explained with reference to a browsing activity of the user 203-1. The method 500 also applies to other user 203 or other online activity.

The method 500 begins with the URL filter 120 receiving a URL in network communications between the client computer 202-1 and a web server computer 201 (step 501). The URL filter 120 consults the cache manager 124 for URL filtering results for the received URL. In response, the cache manager 124 checks the user-specific cache 123 for cache data for the received URL (step 502). Note that the cache manager 124 may search the user cache area 310-1 of the user 203-1 first, followed by other user cache areas 310 (i.e., not just the user cache area 310-1) for cache data for the received URL.

If any user cache area 310 has an entry 312 for the received URL, the cache manager 124 retrieves corresponding cache data in the general cache 122 (step 503) and forwards the cache data, which contains URL filtering results for the received URL, to the URL filter 120. The URL filter 120 then uses the cached URL filtering results to make a decision as to whether to allow or block the network communications involving the received URL. In the case where the cache data for the received URL is found in another cache area 310 (i.e., not in user cache area 310-1 of the user 203-1), the cache manager 124 may update the user cache area 310-1 to include an entry 312 referencing the entry 301 in the general cache 122 containing the cache data for the received URL, and update the reference count 302 of the entry 301.

Otherwise, if there are no entries for the received URL, the cache manager 124 so informs the URL filter 120, which then proceeds to start the URL filtering process on the received URL. The results of that URL filtering process may be cached in the general cache 122 and noted in the user cache area 310-1 of the user 203-1.

As can be appreciated from the foregoing, embodiments of the present invention may be employed in multi-user computer networks to provide improved performance for individual users. These embodiments scale well and may be employed in a variety of computer networks from small home networks to very large enterprise networks.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of providing caching for a URL filtering process in a computer network, the method comprising:

providing a user-specific cache that includes a plurality of user cache areas;

allocating each user in a plurality of users a user cache area in the plurality of user cache areas, each user cache area in the plurality of user cache areas including a plurality of entries reserved for data pertaining to URL filtering for a particular user in the plurality of users;

updating a first user cache area in the plurality of user cache areas to include a reference to a first entry in a general cache area that is shared by a first user and a second user in the plurality of users, the first entry in the general cache area including URL filtering results for a first URL in network communications between a first client computer employed by the first user in the plurality of users and a first web server computer, the first user cache area being reserved for the first user;

updating a second user cache area in the plurality of user cache areas to include a reference to a second entry in the general cache area to cache URL filtering results for a second URL in network communications between a second client computer employed by the second user in the plurality of users and a second web server computer, the second user cache area being reserved for the second user;

updating a reference count in the first entry in the general cache area to indicate a number of user cache areas referencing the first entry in the general cache area;

checking the plurality of user cache areas for a reference to an entry in the general cache area for cached data of results of URL filtering performed on a third URL; and performing URL filtering on the third URL when the plurality of user cache areas does not have a reference to an entry in the general cache area for cached data for the third URL;

wherein the method is performed in a gateway computer through which the first client computer and the second client computer access the Internet.

2. A computer with memory and a processor for reading contents of the memory, the memory comprising:

a URL filter configured to perform URL filtering on URLs received in the computer;

a general cache area that is shared by a plurality of users;

a user-specific cache having a plurality of user cache areas, each user in the plurality of users being reserved a user cache area in the plurality of user cache areas for caching URL filtering data for the user, each of the plurality of user cache areas including a reference to a particular entry in the general cache area that includes a reference count indicating a number of user cache areas in the plurality of user cache areas that references the particular entry;

wherein the computer is configured as a gateway between a client computer on a computer network and a web server computer on the Internet, the URL filter is configured to perform filtering on URLs transmitted between the client computer and the web server computer, and the computer checks the plurality of user cache areas for a reference to an entry in the general cache area for cached data for results of URL filtering performed on a URL, and performs URL filtering on the URL when the plurality of user cache areas does not have a reference to an entry in the general cache area for cached data for the URL.

3. A method of providing caching for a URL filtering process in a computer network, the method comprising:

providing a plurality of personal cache storage areas;

reserving for each user in a plurality of users in the computer network a personal cache storage area in the plurality of personal cache storage areas having a reference to caching data for URL filtering performed on URLs transmitted through a gateway of the computer network, each caching data comprising URL filtering results that include reputation information of a URL, a reference in a personal cache storage area in the plurality of personal cache storage areas referencing an entry in a general cache area shared by the plurality of users;

including a reference count in each entry in the general cache to indicate a number of users for which a corresponding caching data in the entry is being cached;

checking the plurality of personal cache storage areas for a reference to an entry in the general cache area for cached data of results of URL filtering previously performed for a particular URL; and performing URL filtering on the particular URL when the plurality of personal cache storage areas does not have a reference to an entry in the general cache area for cached data for the particular URL.

4. The method of claim 3 further comprising taking the reference count into account in selecting caching data to be removed from the general cache area.

* * * * *